Figure 1:
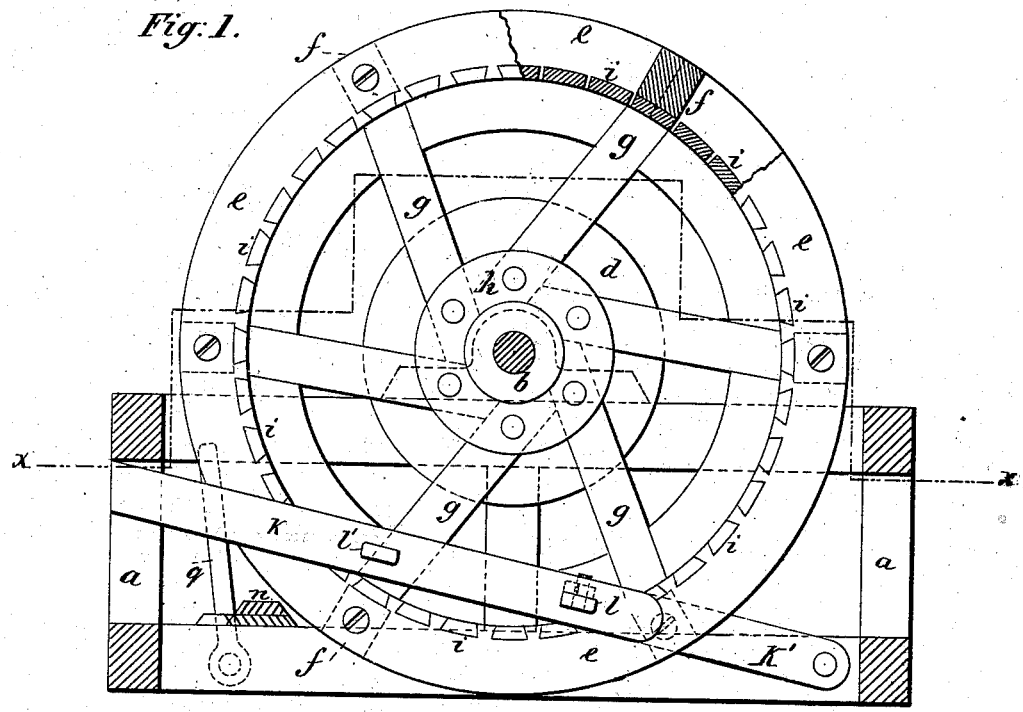

J. H. BLAIN.
Horse-Power.

No. 207,156. Patented Aug. 20, 1878.

WITNESSES:
Achilles Schehl.
C. Sedgwick

INVENTOR:
J. H. Blain
BY Munn &Co
ATTORNEYS.

UNITED STATES PATENT OFFICE.

JOHN H. BLAIN, OF ROUND ROCK, TEXAS.

IMPROVEMENT IN HORSE-POWERS.

Specification forming part of Letters Patent No. 207,156, dated August 20, 1878; application filed June 25, 1878.

*To all whom it may concern:*

Be it known that I, JOHN H. BLAIN, of Round Rock, in the county of Williamson and State of Texas, have invented a new and useful Improvement in Horse-Powers, of which the following is a specification:

The object of my invention is to combine the principles of the lever and endless-tread horse-powers in one machine, and avail of the weight of the horse or other animal; also, to construct a cheap and compact power which will be available for any purpose on a farm or other place where power is needed.

The invention will first be described in connection with the drawing, and then pointed out in the claim.

Figure 2:
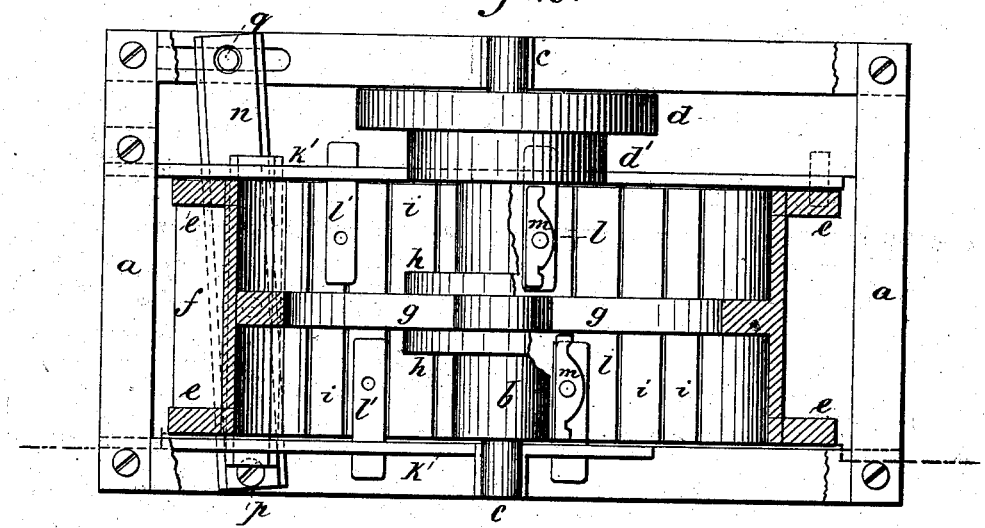

In the drawing, Figure 1 is a sectional elevation of my improved horse-power, and Fig. 2 is a sectional plan of the same at the line $x\,x$ of Fig. 1.

Similar letters of reference indicate corresponding parts.

$a\,a$ is a frame-work of suitable character and dimensions, resting upon the ground or a floor where the power is to be used. $b$ is the main driving-shaft, supported in bearings $c$ on the frame $a$, and carrying the band-wheels $d\,d'$, for connecting the power to the machinery. The tread-wheel is upon the main shaft $b$, and is made of rims $e\,e$, connected by braces or stays $f\,f$, and with arms or spokes $g\,g$, secured at their inner ends to the collars $h$ on the main shaft $b$. The arms $g\,g$ are placed centrally between the rims $e\,e$, so that there is one set of arms to each section or wheel, as seen in the drawing, adapting each section to two horses—one at each side of the arms $g$.

Lugs $i\,i$ upon the inner edges of the rims $e\,e$, passing across from one rim to the other, form the continuous treading-surface at the inside of the wheel. $k\,k'$ are braces, secured rigidly upon the frame $a$, in an inclined position, at each side of the tread-wheel and adjacent to the rims $e\,e$. These braces $k\,k'$ have short arms $l\,l'$ projecting inward over the treading-surface of the wheel, the arms $l\,l$ having upon them the whiffletrees $m\,m$, and the arms $l'\,l'$ serving as hitching-bars for tying the horse's head to. $n$ is a friction-brake upon a fulcrum, $p$, on the frame $a$, and operated by a handle, $q$, to press the brake $n$ against the outside edge of the rims $e\,e$.

The horse or other animal to be used for propelling the wheel is placed at the bottom of the wheel, upon the tread-surface formed by the lugs $i\,i$ and between the arms $l\,l'$. The whiffletree $m$ serves as a means for connecting the traces of the horse, and the animal is fastened by a halter to the arm $l'$.

The wheel shown in the drawing is adapted to receive two horses—one at each side of the arms $g\,g$; but if a wider wheel is used the number of horses may be increased. At one side of the wheel I have shown the arms $l\,l'$ adapted to receive a horse, so that it will stand upon the lowest part of the tread-surface, and in this position the animal is the draft-horse, and exerts his power in a manner similar to the ordinary tread-power. At the other side, the horse which I call the "lever-horse" is somewhat ahead of the draft-horse, and works more by his weight upon the arms $g$, which act as levers to impart a revolution to the shaft $b$.

With this form of wheel only one horse need be used, as it can be operated by one or two; but the wheel may be made especially adapted to one horse by constructing it narrower and with a single treading-surface.

By the construction shown gearing is dispensed with, and I am able to furnish a cheap and effective power for running cotton-gins, thrashers, pumps, wood-saws, &c., and it may be operated by horses, oxen, dogs, or other animals.

The wheel may be made of wood or metal, and of a size suitable for a fixed or portable power.

I do not limit myself to the details set forth, as they may be varied without departing from the essential features of my invention. It is evident that two horses may be used on the same treading-surface, one in advance of the other, and the braces $k\,k'$ made adjustable for that purpose.

Having thus described my invention, I claim as new and desire to secure by Letters Patent—

The braces $k\,k'$ and arms $l\,l'$, in combination with the tread-wheel, substantially as and for purposes set forth.

JOHN HARVEY BLAIN.

Witnesses:
 W. C. HUSSEY,
 R. W. VAUGHAN.